(12) United States Patent
Huber

(10) Patent No.: US 9,815,726 B2
(45) Date of Patent: Nov. 14, 2017

(54) APPARATUS, SYSTEMS, AND METHODS FOR PRE-HEATING FEEDSTOCK TO A MELTER USING MELTER EXHAUST

(71) Applicant: JOHNS MANVILLE, Denver, CO (US)

(72) Inventor: Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/844,198

(22) Filed: Sep. 3, 2015

(65) Prior Publication Data

US 2017/0066672 A1    Mar. 9, 2017

(51) Int. Cl.
*C03B 3/02* (2006.01)
*C03B 5/235* (2006.01)

(52) U.S. Cl.
CPC ............ *C03B 3/023* (2013.01); *C03B 5/2356* (2013.01); *C03B 2211/22* (2013.01)

(58) Field of Classification Search
CPC .................................................. C03B 3/023
See application file for complete search history.

(56) References Cited

U.S. PATENT DOCUMENTS

| | | | |
|---|---|---|---|
| 1,579,353 A | 4/1926 | Good | |
| 1,610,376 A | 12/1926 | Hitner | |
| 1,636,151 A | 7/1927 | Schofield | |
| 1,679,295 A | 7/1928 | Dodge | |
| 1,706,857 A | 3/1929 | Mathe | |
| 1,716,433 A | 6/1929 | Ellis | |
| 1,875,474 A | 9/1932 | McKinley | |
| 1,883,023 A | 10/1932 | Slick | |
| 1,937,321 A | 11/1933 | Howard | |

(Continued)

FOREIGN PATENT DOCUMENTS

| | | |
|---|---|---|
| DE | 36 29 965 A1 | 3/1988 |
| DE | 40 00 358 C2 | 3/1993 |

(Continued)

OTHER PUBLICATIONS

"Gamma Irradiators for Radiation Processing" Booklet, International Atomic Energy Agency, Vienna, Austria.

(Continued)

*Primary Examiner* — Erin Snelting
(74) *Attorney, Agent, or Firm* — Robert D. Touslee

(57) ABSTRACT

Feedstock supply structure apparatus, including an exhaust conduit fluidly and mechanically connectable to a structure defining a melting chamber, the exhaust conduit positioned at an angle to vertical ranging from 0 to about 90 degrees. The exhaust conduit may include a heat exchange substructure, or the conduit itself may serve as a heat exchanger. A feedstock supply structure fluidly connected to the exhaust conduit. Systems include a structure defining a melting chamber and an exhaust conduit fluidly connected to the structure. The exhaust conduit includes a heat exchange substructure for preheating the feedstock. Methods include supplying a granular or pellet-sized feedstock to the melter exhaust conduit, the exhaust conduit including the heat exchange substructure, and preheating the feedstock by indirect or direct contact with melter exhaust in the heat exchange substructure.

5 Claims, 5 Drawing Sheets

(56) References Cited

U.S. PATENT DOCUMENTS

| | | |
|---|---|---|
| 1,944,855 A | 1/1934 | Wadman |
| 1,989,103 A | 1/1935 | McKelvey et al. |
| 2,042,560 A | 6/1936 | Stewart |
| 2,057,393 A | 10/1936 | Powell |
| 2,064,546 A | 12/1936 | Kutchka |
| 2,174,533 A | 1/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,190,625 A | 6/1965 | Edgard et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Womer |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,599 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,605,437 A | 8/1986 | Sugiura et al. |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,652,289 A | 3/1987 | Drouet et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |

(56) References Cited

U.S. PATENT DOCUMENTS

| | | |
|---|---|---|
| 4,818,265 A | 4/1989 | Krumwiede et al. |
| 4,877,436 A | 10/1989 | Sheinkop |
| 4,877,449 A * | 10/1989 | Khinkis ............... C01B 25/027 266/185 |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,886 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillippe et al. |
| 6,071,116 A | 6/2000 | Phillippe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |

(56) References Cited

U.S. PATENT DOCUMENTS

| | | |
|---|---|---|
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Takagi et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0007622 A1 | 1/2014 | Shock et al. |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |

FOREIGN PATENT DOCUMENTS

| | | |
|---|---|---|
| DE | 44 24 814 A1 | 1/1996 |
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 105 415 A1 | 9/2009 |
| EP | 2 133 315 A1 | 12/2009 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| FR | 2 740 860 A1 | 9/1997 |
| GB | 191301772 | 0/1914 |
| GB | 191407633 | 0/1914 |
| GB | 164073 A | 5/1921 |
| GB | 909 806 A | 11/1962 |
| GB | 1449439 | 9/1976 |
| IT | 1208172 | 7/1989 |
| JP | S58 199728 A | 11/1983 |
| KR | 2000 0050572 A | 8/2000 |
| KR | 100465272 B1 | 12/2004 |
| RO | 114827 | 7/1999 |

(56) References Cited

FOREIGN PATENT DOCUMENTS

| WO | 82/00460 A1 | 2/1982 |
|---|---|---|
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |

OTHER PUBLICATIONS

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Gerber, J., "Les Densimetres Industriels," Petrole et Techniques, Association Francaise des Techniciens du Petrole, Jun. 1, 1989, pp. 26-27, No. 349, Paris, France.

Rue et al, "Submerged Combustion Melting of Glass," International Journal of Applied Glass Science, Nov. 9, 2011, pp. 262-274, vol.2, No. 4.

National Laboratory, US DOE contract No. DE-AC09-08SR22470, Oct. 2011.

"AccuTru Temperature Measurement," AccuTru International Corporation, 2003.

"Glass Technologies—The Legacy of a Successful Public-Private Partnership", 2007, U.S. Department of Energy, pp. 1-32.

"Glass Melting Technology—A Technical and Economic Assessment," 2004, U.S. Department of Energy, pp. 1-292.

Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.

Rue, "Energy-Efficient Glass Melting—The Next Generation Melter", Gas Technology Institute, Project No. 20621 Final Report (2008).

Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.

Sims, Richard, "Batch charging technologies—a review", www.glassonweb.com, Nikolaus Sorg Gmbh & Co KG (May 2011).

"Canty Process Technology" brochure, date unknown, copy received in Apr. 2012 at American Institute of Chemical Engineers, Spring Meeting, Houston, TX.

"Glass Melting", Battelle PNNL MST Handbook, U.S. Department of Energy, Pacific Northwest Laboratory, retrieved from the Internet Apr. 20, 2012.

"Roll Compaction", brochure from The Fitzpatrick Company, Elmhurst, Illinois, retrieved from the Internet Apr. 20, 2012.

"Glass Industry of the Future", United States Department of Energy, report 02-GA50113-03, pp. 1-17, Sep. 30, 2008.

Stevenson, "Foam Engineering: Fundamentals and Applications", Chapter 16, pp. 336-389, John Wiley & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 74(3), pp. 551-555, 1991.

Kim et al., "Foaming in Glass Melts Produced by Sodium Sulfate Decomposition under Ramp Heating Conditions", Journal of the American Ceramic Society, 75(11), pp. 2959-2963, 1992.

Kim et al., "Effect of Furnace Atmosphere on E-glass Foaming", Journal of Non-Crystalline Solids, 352(50/51), pp. 5287-5295, 2006.

Van Limpt et al., "Modelling the evaporation of boron species. Part 1. Alkali-free borosilicate glass melts", Glass Technology—European Journal of Glass Science and Technology, Part A, 52(3): pp. 77-87, 2011.

Oblain, V.M. et al, "Submerged Combustion Furnace for Glass Melts," Ceramic Engineering and Science Porceedings, Jan. 1, 1996, pp. 84-92, vol. 17—No. 2, American Ceramic Society Inc., US.

\* cited by examiner

APPARATUS, SYSTEMS, AND METHODS FOR PRE-HEATING FEEDSTOCK TO A MELTER USING MELTER EXHAUST

BACKGROUND INFORMATION

Technical Field

The present disclosure relates generally to the field of combustion melters and apparatus, and methods of use, and more specifically to submerged and conventional combustion melters, and methods of their use, particularly for melting glass-forming materials, mineral wool forming materials, and other non-metallic inorganic materials.

Background Art

A submerged combustion melter (SCM) may be employed to melt glass batch and/or waste glass materials to produce molten glass, or may melt mineral wool feedstock to make mineral or rock wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock and much turbulence and foaming. Conventional melters operate primarily by combusting fuel and oxidant above the molten pol of melt, and are very laminar in flow characteristics compared to SCMs. While most of the present disclosure discusses SCM, the disclosure is pertinent to conventional melters as well.

Oxy-fuel burners and technologies provide high heat transfer rates, fuel consumption reductions (energy savings), reduced volume of flue gas, and reduction of pollutants emission, such as oxides of nitrogen (NOx), carbon monoxide (CO), and particulates. Despite the reduction of the flue gas volume that the substitution of combustion with air by combustion with pure oxygen or oxygen-enriched air yields, a significant amount of energy is lost in the flue gas (also referred to herein as exhaust or exhaust gases), especially for high temperature processes. For example, in an oxy-fuel fired glass furnace where all the fuel is combusted with pure oxygen, and for which the temperature of the flue gas at the furnace exhaust is of the order of 1350° C., typically 30% to 40% of the energy released by the combustion of the fuel is lost in the flue gas. It would be advantageous to recover some of the energy available from the flue gas in order to improve the economics of operating an oxy-fuel fired furnace, whether SCM or conventional melter.

One technique consists in using the energy available in the flue gas to preheat and/or dry out the raw materials before loading them into the furnace. In the case of glass melting, the raw materials may comprise recycled glass, commonly referred to as Cullet, and other minerals and chemicals in a pulverized form referred to as batch materials that have a relatively high water content. The energy exchange between the flue gas and the raw materials may be carried out in a batch/cullet preheater. Such devices are commonly available, for example from Zippe Inc. of Wertheim, Germany. Experience shows that this technology is difficult to operate when the batch represents more than 50% of the raw materials because of a tendency to plug. This limits the applicability of the technique to a limited number of glass melting operations that use a large fraction of cullet. Another drawback of this technique (according to the known art) is that the inlet temperature of the flue gas in the materials preheater must be generally kept lower than 600° C. in the case of an oxy-fuel fired furnace where the flue gas is produced at a temperature higher than 1000° C., one reference (U.S. Pat. No. 6,250,916) discloses that cooling of the flue gas prior to the materials preheater would be required. This would be counterproductive.

One low-cost non-metallic inorganic material being used to make inorganic fibers is basalt rock, sometimes referred to as lava rock. US20120104306 discloses a method for manufacturing basalt filament, comprising the steps of grinding basalt rock as a material, washing a resultant ground rock, melting the ground rock that has been washed, transforming a molten product into fiber, and drawing the fiber in an aligned manner, and winding it. The temperature of the molten product in the melting step is 1400 to 1650° C., and log η is 2.15 to 2.35 dPa·s and more preferably 2.2 to 2.3 dPa·s, where η is the viscosity of the molten product. The size of basalt rock may be on the order of several mm to several dozens of mm, or several μm to several dozens of mm, according to this reference.

It would be an advanced in the melter art, and in particular the submerged combustion melter art, to improve energy usage while avoiding the heat loss from the exhaust while melting granular or pellets-size material (much larger than several dozens of mm), and prolong the run-length or campaign length of submerged combustion melters.

SUMMARY

In accordance with the present disclosure, submerged combustion (SC) burner panels are described that may reduce or eliminate problems with known SC burners, melters, and methods of using the melters to produce molten glass and other non-metallic inorganic materials, such as rock wool and mineral wool.

One aspect of this disclosure is a system comprising (or consisting essentially of, or consisting of):
  (a) a structure defining a melting chamber;
  (b) one or more exhaust conduits fluidly connected to the structure defining the melting chamber and comprising a heat exchange substructure, the one or more exhaust conduits positioned at an angle to vertical ranging from 0 to about 90 degrees (or from about 10 to about 75 degrees, or from about 25 to about 60 degrees); and
  (c) a feedstock supply structure fluidly connected to the one or more exhaust conduits.

Another aspect of this disclosure is a feedstock supply structure apparatus comprising (or consisting essentially of, or consisting of):
  (a) an exhaust conduit fluidly and mechanically connectable to a structure defining a melting chamber, the exhaust conduit positioned at an angle to vertical ranging from 0 to about 90 degrees;
  (b) the exhaust conduit comprising a heat exchange substructure; and
  (c) a feedstock supply structure fluidly connected to the exhaust conduit.

Another aspect of this disclosure is a method comprising (or consisting essentially of, or consisting of):
  (a) supplying a granular or pellet-sized feedstock to an exhaust conduit from a melter, the exhaust conduit comprising a heat exchange substructure;
  (b) preheating the granular or pellet-sized feedstock by indirect or direct contact with melter exhaust in the heat exchange substructure.

Other system, apparatus, and method embodiments, such as methods of producing molten non-metallic inorganic materials such as molten glass or molten rock, in conventional melters and SCMs, are considered aspects of this disclosure. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Systems, apparatus, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
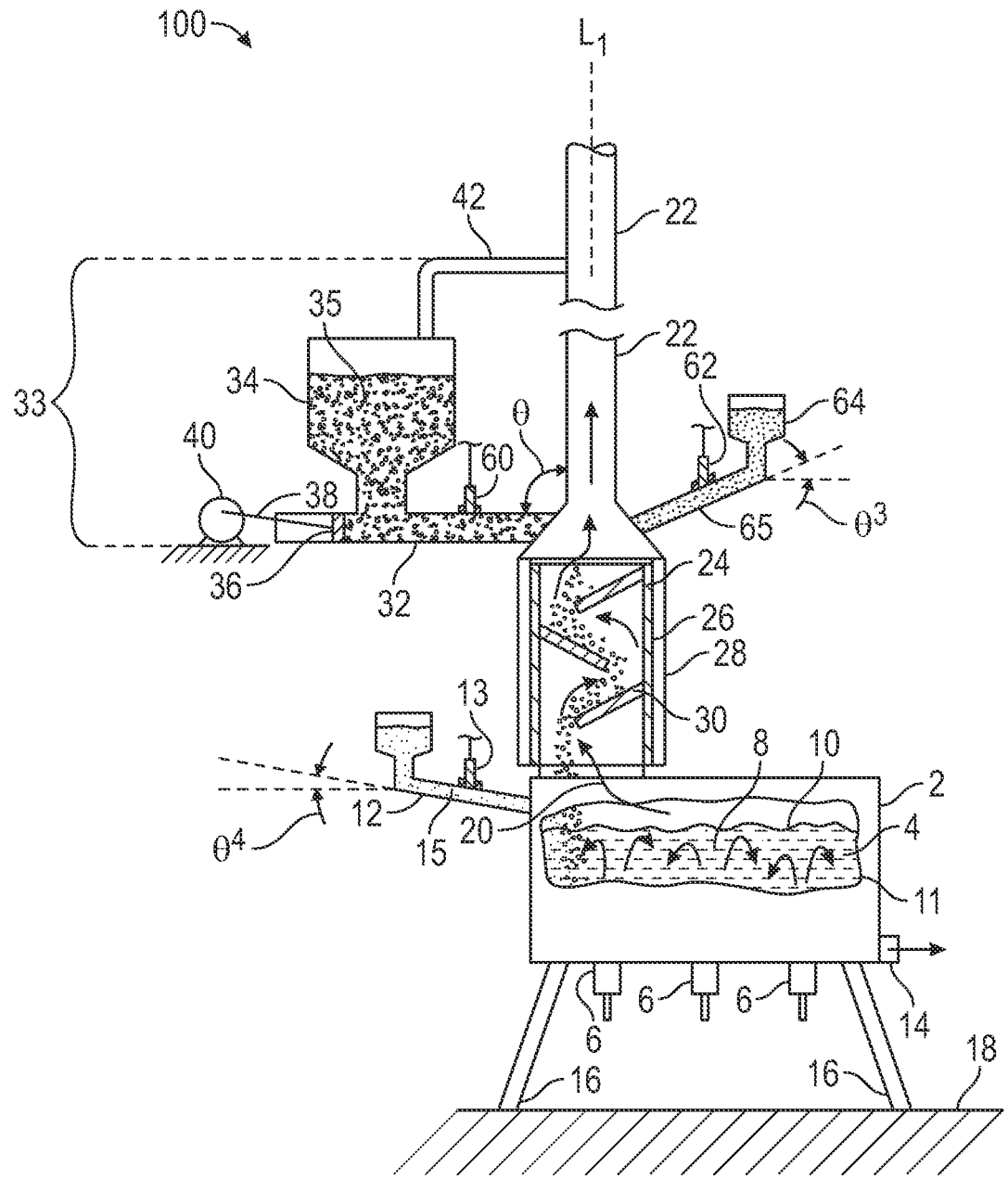
FIGS. 1, 2, and 3 are schematic side elevation views, partially in cross-section, of three system and method embodiments in accordance with the present disclosure.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed systems, apparatus, and methods. However, it will be understood by those skilled in the art that the systems, apparatus, and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are explicitly disclosed herein and are part of this disclosure. All published patent applications and patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present melters, especially those employing oxy-fuel burners and technologies, despite the fact that they provide high heat transfer rates, fuel consumption reductions (energy savings), reduced volume of flue gas, and reduction of pollutants emission, such as oxides of nitrogen (NOx), carbon monoxide (CO), and particulates, a significant amount of energy is lost in the flue gas (also referred to herein as exhaust or exhaust gases), especially for high temperature processes. For example, in an oxy-fuel fired glass furnace where all the fuel is combusted with pure oxygen, and for which the temperature of the flue gas at the furnace exhaust is of the order of 1350° C., typically 30% to 40% of the energy released by the combustion of the fuel is lost in the flue gas. The present application is devoted to resolving this challenge by pre-heating large size feedstock prior to that feedstock entering the melter. As used herein, unless indicated to the contrary, "feedstock" means pieces of porous, semi-porous, or solid rock or other non-metallic inorganic material having a weight average particle size ranging from about 1 cm to about 10 cm, or from about 2 to about 5 cm, or from about 1 to about 2 cm. The only upper limit on feedstock weight average particle size is the internal diameter of feedstock supply structure components, as described herein, while the lower size limit is determined by angle of flow, flow rate of feedstock, and (in those embodiments where heat exchange is direct) flow rate of exhaust.

Various terms are used throughout this disclosure. "Submerged" as used herein means that combustion gases emanate from combustion burners or combustion burner panels under the level of the molten glass; the burners or burner panels may be floor-mounted, wall-mounted, or in melter embodiments comprising more than one submerged combustion burner, any combination thereof (for example, two floor mounted burner panels and one wall mounted burner panel). Burner panels (such as described in assignee's U.S. patent application Ser. No. 14/838,148, filed Aug. 27, 2015 may form part of an SCM floor and/or wall structure. In certain embodiments one or more burner panels described herein may form the entire floor. A "burner panel" is simply a panel equipped to emit fuel and oxidant, or in some embodiments only one of these (for example a burner panel may only emit fuel, while another burner panel emits only oxidant, and vice versa). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. "Exhaust", "melter exhaust", and "melter flue gas" are equivalent terms and refer to a combination of combustion gases and effluent from the feedstock being melted, such as adsorbed water, water of hydration, $CO_2$ liberated from $CaCO_3$, and the like. Therefore exhaust may comprise oxygen or other oxidants, nitrogen, combustion products (including but not limited to, carbon dioxide, carbon monoxide, $NO_x$, $SO_x$, $H_2S$, and water), uncombusted fuel, reaction products of melt-forming ingredients (for example, but not limited to, basalt, sand (primarily $SiO_2$), clay, limestone (primarily $CaCO_3$), burnt dolomitic lime, borax and boric acid, and the like.

"Oxidant" as used herein includes air, gases having the same molar concentration of oxygen as air (for example "synthetic air"), oxygen-enriched air (air having oxygen concentration greater than 21 mole percent), and "pure" oxygen grades, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facilities, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Figure 2:
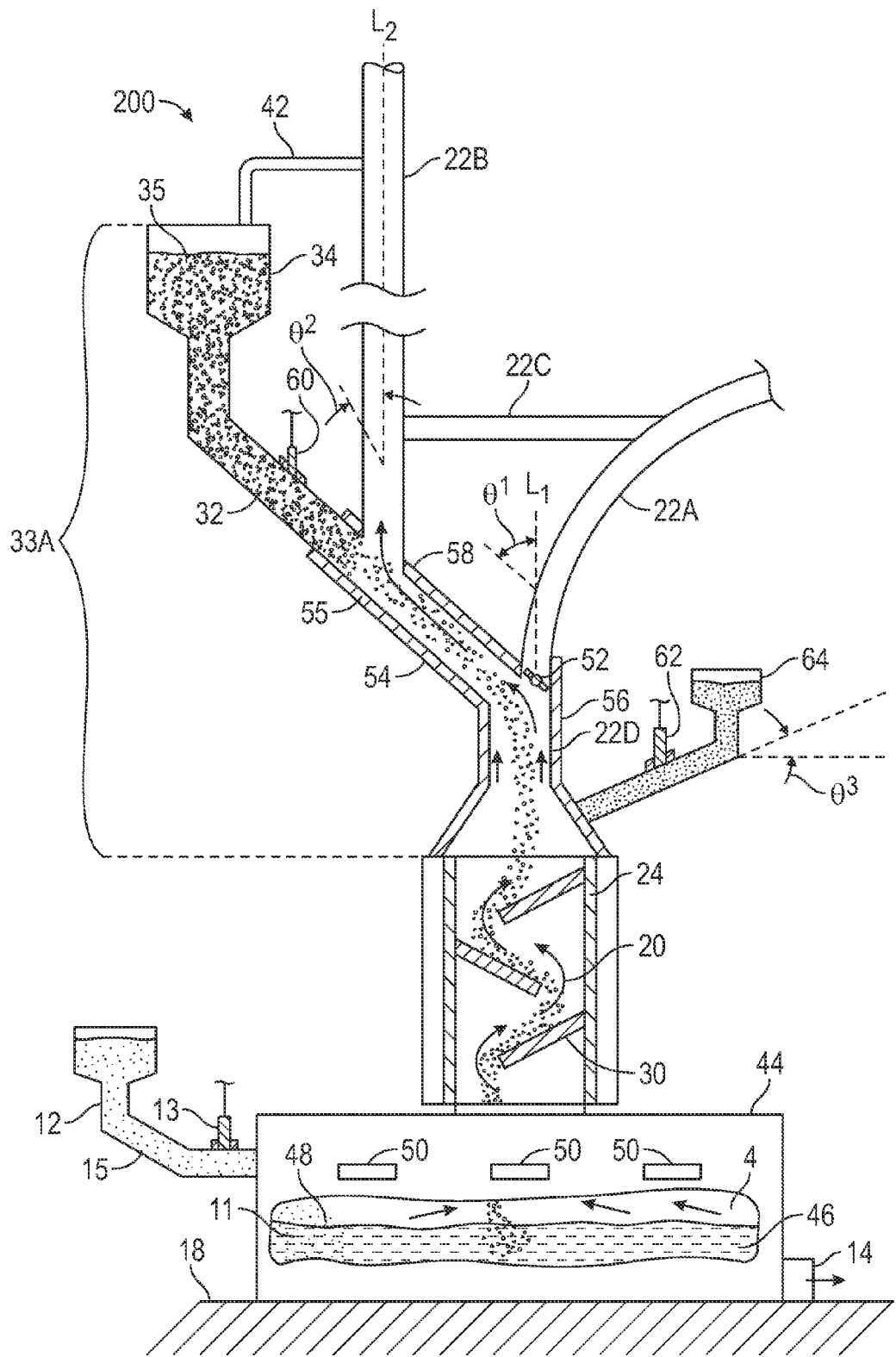
Figure 3:
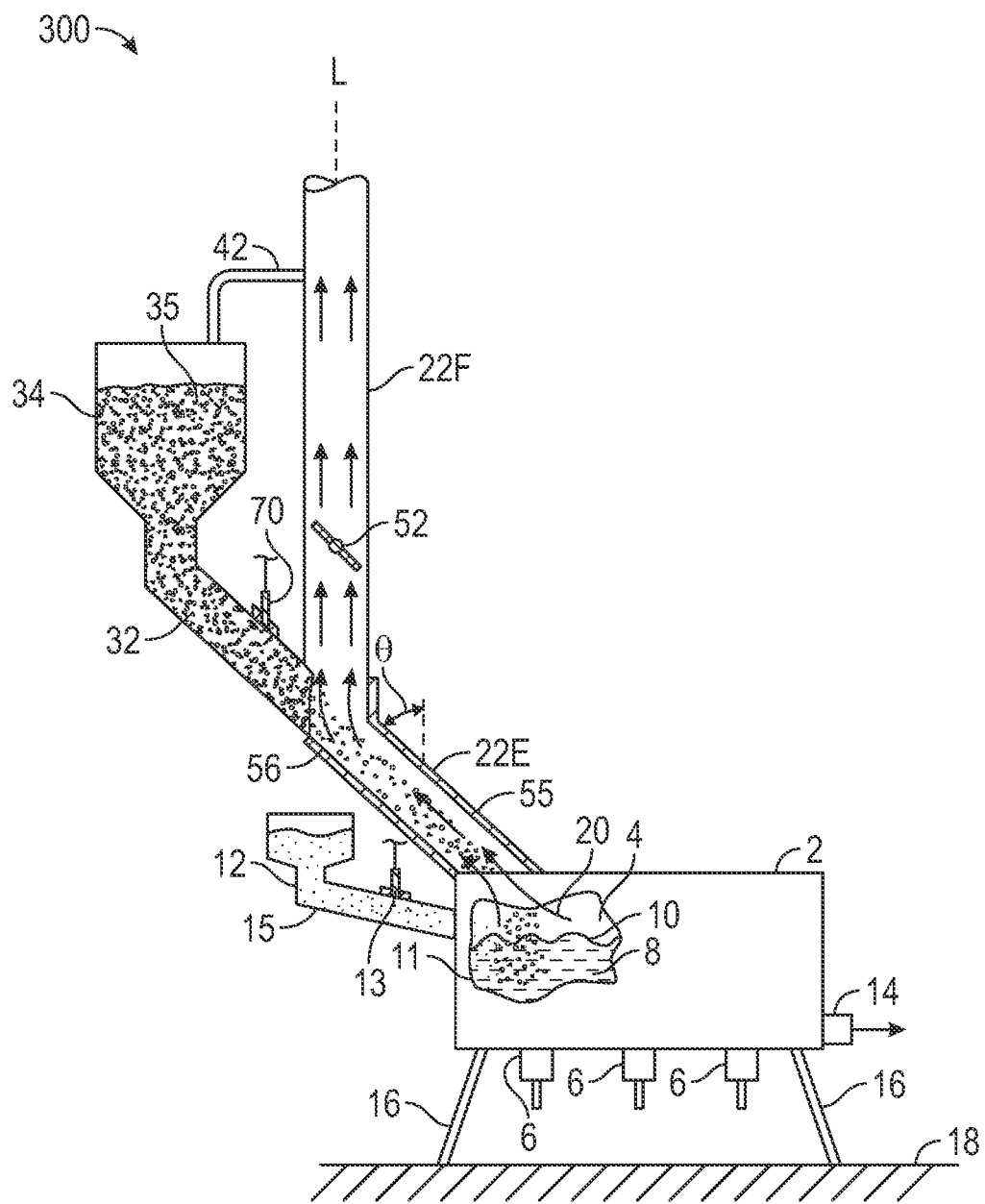

FIGS. 1, 2, and 3 are schematic side elevation views, partially in cross-section, of three system and method embodiments 100, 200, and 300 in accordance with the present disclosure. Systems, apparatus, and methods of the present disclosure aim to solve or at least reduce the problem of energy loss as heat in combustion melters, and even in purely electric (Joule heated) melters. Embodiment 100 illustrated schematically in FIG. 1 includes a structure 2 (otherwise referred to herein as a melter) defining a melting chamber 4, a plurality of SC burners 6 producing a turbulent melt 8 of molten glass, molten rock, and the like, as indicated by curved arrows in turbulent melt 8 in melting chamber 4. A turbulent surface 10 is illustrated as viewable in cutout section 11. A batch feeder 12 for feeding particulates and/or powdered batch materials (materials having weight average particle size less than about 1 cm, or less than about 1 mm) through a batch feed conduit 15 and valve arrangement 13, such as one or more glass batch materials, is illustrated fluidly attached to melter 2. Batch feed conduit 15 may be positioned at an angle $\theta^4$ ranging from about 25 to about 75 degrees. A melter outlet 14, system supports 16, and plant floor 18 are illustrated schematically in FIG. 1, as are exhaust conduit longitudinal axis $L_1$.

During operation of embodiment 100, melter 2 and SC burners 6 produce an exhaust, indicated at arrow 20 in embodiment 100 of FIG. 1. In previously known systems and methods, exhaust 20 would pass up exhaust conduit 22 and much energy as heat would be wasted. In accordance with embodiment 100 of the present disclosure, a feedstock heat exchange substructure 24 is provided as a section of exhaust conduit 22, substructure 24 including in embodiment 100 a refractory lining 26 and a metal superstructure 28, the latter possibly fluid-cooled or insulated as conditions dictate. One or more feedstock flow diverters 30 is provided internal of substructure 24 in embodiment 100 for effecting direct heat exchange from exhaust 20 flowing tortuously upward to feedstock 35 flowing tortuously downward. Feedstock flow diverters 30 may for example comprise one or more baffles, distributor plates, grids, and the like for causing a tortuous flow path for feedstock 35 and for exhaust 20. Feedstock flow diverters 30 may take any shape, for example flat plates, corrugated plates, plates having a variety of projections or protuberances therefrom such as spikes, knobs, lumps, bumps, and the like, of a variety of sizes, or all the same size. In certain embodiments the relative flow of feedstock and exhaust through feedstock heat exchange substructure 24 may be counter-current, co-current, or cross-current. Flow of feedstock may be continuous, semi-continuous, semi-batch, or batch. For example, in certain embodiments feedstock could flow into feedstock heat exchange substructure 24 until feedstock heat exchange substructure 24 is partially full or completely full of feedstock, then the pre-heated stock may be dumped into melting chamber 4. One way of accomplishing that may be by use of a grating at the bottom of feedstock heat exchange substructure 24 having openings slightly smaller than the feedstock particle size.

Referring again to FIG. 1 and embodiment 100, a feedstock supply structure 33 is provided in embodiment 100 comprising a horizontal feedstock supply conduit 32, one or more feedstock supply containers 34, and a feedstock advancing mechanism 36. Horizontal feedstock supply conduit 32 is at an angle to vertical θ of about 90 degrees in embodiment 100. Feedstock advancing mechanism 36 may be a piston, plunger, or other like component within horizontal feedstock supply conduit 32, and may be connected via a tie rod 38 or other feature to a prime mover 40, such as a reciprocating engine or motor. A feedstock flow control component 60 may comprise a sliding gate device, valve, or other component that functions to control and/or stop flow of feedstock in case of emergency. A vent conduit 42 may be provided, allowing any exhaust that should escape exhaust conduit 22 and travel into the feedstock supply structure to be vented back to exhaust conduit 22. One or more pressure relief devices (not illustrated) may also be provided. It should be recognized that such an arrangement of feedstock supply structure 33 (including a feedstock advancing mechanism) may be required in other embodiments where feedstock supply conduit 32 is not strictly horizontal, such as when angle to vertical θ is less than 90 degrees, such as 85, 80, 75 degrees, or lower, depending on the feedstock composition, average particle size, size of equipment (internal diameters) and the like. In yet other embodiments, in addition to or in place of feedstock advancing mechanism, a shaker device (not illustrated) may be employed, with suitable flexible connections between components (or no physical connection) that shakes or agitates feedstock supply conduit 32.

Optionally, one or more auxiliary batch feeders 64 may be provided, feeding batch or other material through an auxiliary batch feed conduit 65 and valve 62 into exhaust conduit 22 to be pre-heated in feedstock heat exchange substructure 24. Such arrangement may be beneficial if feedstock heat exchange substructure 24 is shut down for repair or renovation. Auxiliary batch feed conduit 65 may be positioned at an angle $\theta^3$ ranging from about 25 to about 75 degrees.

FIG. 2 illustrates another system embodiment 200 in accordance with the present disclosure. System 200 includes a non-submerged combustion melter 44 having a plurality of non-SC burners 50 that combust a fuel with an oxidant above a non-turbulent molten pool of melt 46. A non-turbulent surface 48 of non-turbulent molten pool of melt 46 is very calm compared to the very turbulent SC embodiment illustrated schematically in FIG. 1, embodiment 100. Embodiment 200 comprises a primary exhaust conduit 22A having a longitudinal axis $L_1$, an offset exhaust conduit 22B having a longitudinal axis $L_2$, an auxiliary exhaust conduit 22C, and an insulated exhaust conduit 22D. Feedstock supply structure 33A includes an angled feedstock supply conduit 32 including an insulated section 54, and insulation 55. Insulated section 54 is at an angle of $\theta^1$ ranging from about 25 to about 75 degrees to axis $L_1$, and feedstock supply conduit 32 is at an angle of $\theta^2$ ranging from about 25 to about 75 degrees to axis $L_2$, where $\theta^1$ and $\theta^2$ may be the same or different; in certain embodiments $\theta^1$ may be more than $\theta^2$ (for example, $\theta^1$ may be about 75 degrees, and $\theta^2$ may be about 45 degrees).

Exhaust conduits 22A and 22D fluidly connect to insulated section 54 of feedstock supply conduit 32 through a first 3-way connector 56, while a second 3-way connector 58 fluidly connects insulated section 54, feedstock supply conduit 32, and offset exhaust conduit 22B. First and second 3-way connectors may be Y-connectors, T-connectors, and the like. Feedstock 35 flows by gravity out of feedstock supply container 34, controlled by size of angled feedstock supply conduit 32 and angle $\theta^2$ ranging from about 25 to about 75 degrees, or from about 25 to about 60 degrees, and optionally by valve 60, through insulated section 54 and into heat exchange substructure 24, and finally into melting chamber 4 of melter 44, as viewable in cutout section 11. A damper or other flow diverter mechanism 52 is provided to divert part or all of flow of exhaust 20 from melter 44 to flow through insulated conduit 54 rather than through primary exhaust conduit 22A. In embodiment 200, direct heat exchange may be provided only in heat exchange substructure 24, if flow diverter 52 is open, or direct heat exchange may be provided in both heat exchange substructure 24 and in insulated conduit 54, if flow diverter 52 is closed or partially closed. Flow diverter mechanism 52 is in turn connected to a prime mover (not illustrated) controlled for example by a supervisory melter controller.

During operation of embodiment 200, in conduit 54 the feedstock may be tumbling and closely packed, while in heat exchange substructure 24 the feedstock is falling and may be less compact, providing essentially two different heat exchange opportunities.

It will be understood that one or more non-SC combustion burners 50 may be replaced by SC burners; Joule heating elements may be employed in conjunction with SC or non-SC burners, or as complete replacements for all burners, although roof burners may be desired for start-up.

FIG. 3 illustrates another system embodiment 300 in accordance with the present disclosure, wherein at least one of the one or more exhaust conduits comprises an angled, insulated exhaust conduit 22E serving as the heat exchange substructure. The angled, insulated exhaust conduit 22E fluidly connects melting chamber 4 to a 3-way flow connector 56, the 3-way flow connector 56 fluidly connecting angled, insulated exhaust conduit 22E with an angled feedstock supply conduit 32 and to a vertical exhaust conduit 22F. In embodiment 300, angled, insulated exhaust conduit 22E and feedstock supply conduit 32 are each positioned at an angle of $\theta$ ranging from about 25 to about 75 degrees to axis L of vertical exhaust conduit 22F. Embodiment 300 may also include an exhaust flow control mechanism 52 (damper or other component) to vary the flow rate of exhaust through exhaust conduits 22E, 22F; for example, it may be desired to decrease the flow of exhaust 20 in order to provide more time for heat transfer from exhaust 20 to feedstock 35. Similarly, embodiment 300 may include a feedstock flow control mechanism 70 to control or completely shut off flow of feedstock.

Figure 4A:
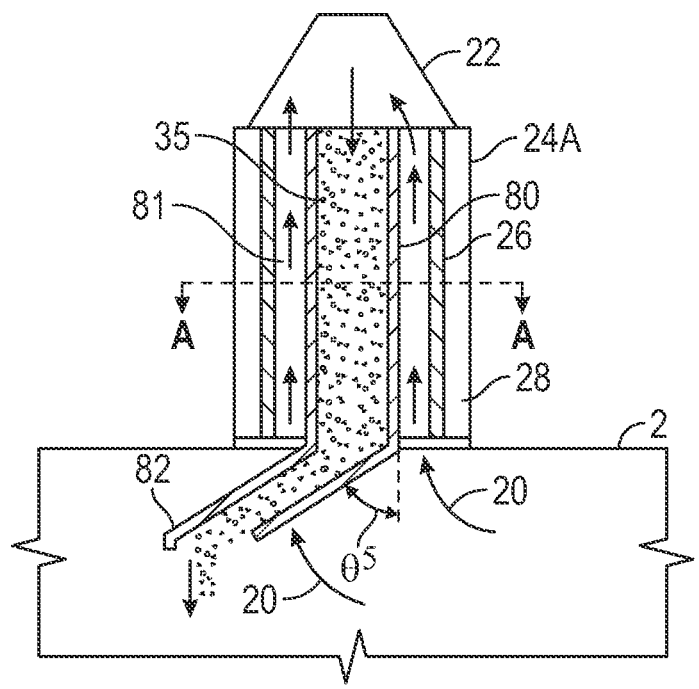
FIGS. 4A and 4B are schematic side cross-sectional and axial cross-sectional views, respectively, of one indirect heat exchange embodiment in accordance with the present disclosure.
Figure 4B:
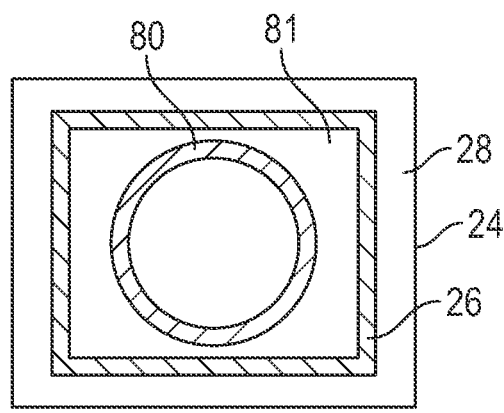

FIGS. 4A and 4B are schematic side cross-sectional and axial cross-sectional views (A-A), respectively, of one indirect heat exchange substructure embodiment 24A in accordance with the present disclosure, including an internal plenum 80 (refractory, noble metal, or other high-temperature material) serving to route exhaust 20 from melter 2 through a space 81 between plenum 80 and refractory 26. Plenum 80 also serves to define a passage for feedstock 35 to fall without directly contacting exhaust 20. A downcomer 82, optionally angled away from the melting chamber, for example at an angle $\theta^5$ to vertical ranging from about 25 to about 75 degrees, may be provided to enhance the tendency of exhaust 20 to travel up through space 81 between plenum 80 and refractory 26. The cross-sectional shape of plenum 80 is illustrated schematically in FIG. 4B as circular, but this could vary to other shapes such as rectangular, triangular, and the like, and a plurality of plenums 80 may be provided, for example two or more conduits having internal diameters larger than the feedstock size. The cross-sectional shape of refractory 26 and metal superstructure 28 may also vary from rectangular as illustrated in FIG. 4B.

Figure 5A:
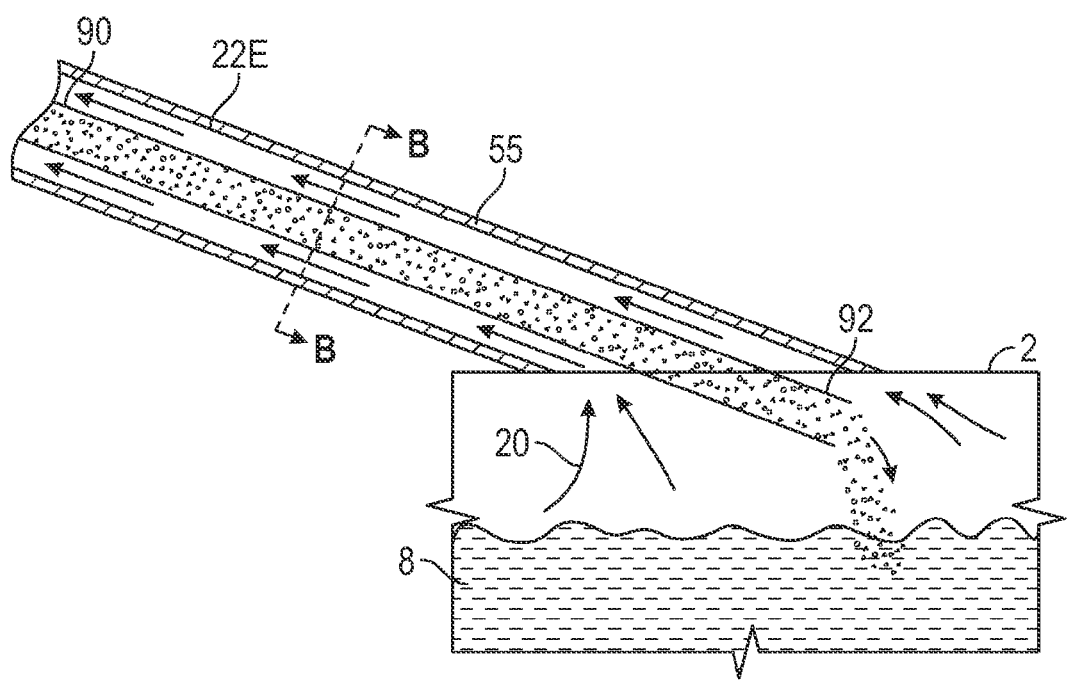
FIGS. 5A and 5B are schematic side cross-sectional and axial cross-sectional views, respectively, of another indirect heat exchange embodiment in accordance with the present disclosure.
Figure 5B:
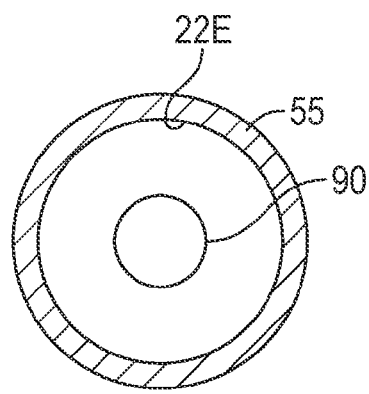

FIGS. 5A and 5B are schematic side cross-sectional and axial cross-sectional views (B-B), respectively, of another indirect heat exchange embodiment in accordance with the present disclosure. In this embodiment an internal feedstock supply conduit 90 is provided, which may be simply a continuation of feedstock supply conduit 32 illustrated in embodiments 100, 200, and 300. As illustrated schematically in FIG. 5A, internal feedstock supply conduit may have a distal end 92 protruding in to melter 2 a short distance I order to enhance the tendency of melter exhaust 20 to traverse around internal feedstock supply conduit 90 as illustrated. Due to the high temperatures experienced at the distal end 92, distal end 92 (or a part or all of internal feedstock conduit 90) may comprise one or more high-temperature refractory materials or one or more noble metals. While FIG. 5B illustrates internal feedstock conduit 90 and insulated exhaust conduit 22E as having circular cross-sections, other shapes such as rectangular, triangular, and the like may be employed.

Methods of the disclosure may be summarized for system embodiment 100, 200 and 300 as follows. System 100 may be operated by a method comprising:
 (a) supplying a granular or pellet-sized feedstock to an exhaust conduit from a melter, the exhaust conduit comprising a heat exchange substructure;
 (b) preheating the granular or pellet-sized feedstock by indirect contact with melter exhaust in the heat exchange substructure.

Other methods may comprise:
 (a) supplying a granular or pellet-sized feedstock to an exhaust conduit from a melter, the exhaust conduit comprising a heat exchange substructure;
 (b) preheating the granular or pellet-sized feedstock by direct contact with melter exhaust in the heat exchange substructure.

Yet other methods may comprise:
 (a) supplying a granular or pellet-sized feedstock to an exhaust conduit from a melter, the exhaust conduit serving as a heat exchange substructure;
 (b) preheating the granular or pellet-sized feedstock by direct contact with melter exhaust in the exhaust conduit.

The initial raw material feedstock 35 may include any material suitable for forming molten inorganic materials having a weight average particle size such that most if not all of the feedstock is not fluidized when traversing through the heat exchange structure or exhaust conduit serving as the heat exchange structure. Such materials may include glass precursors or other non-metallic inorganic materials, such as, for example, limestone, glass cullet, feldspar, basalt or other rock wool forming material, and mixtures thereof. Typical examples of basalt that are compositionally stable and available in large quantities are reported in the aforementioned U.S. Patent Publication 2012/0104306, namely an ore having a larger amount of $SiO_2$ (A, for high-temperature applications) and an ore having a smaller amount of $SiO_2$ (B, for intermediate-temperature applications), both of which have approximately the same amount of Al2O3. Although ore A can be spun into fiber, the resultant basalt fiber has heat-resistance problem at temperature ranges exceeding 750° C. Ore B, on the other hand, is associated with higher energy cost for mass production of fiber. The basalt rock material feedstock for use on the systems and methods of the present disclosure may be selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount of $SiO_2$; and (3) a mixture of the high-temperature basalt rock ore (A) and the intermediate-temperature basalt rock ore (B).

Basalt rock (basalt ore) is an igneous rock. According to U.S. Patent Publication 2012/0104306, major examples of the constituent mineral include: (1) plagioclase: $Na(AlSi_3O_8)$—$Ca(Al_2SiO_8)$; (2) pyroxene: $(Ca, Mg, Fe2+, Fe3+, Al, Ti)_2[(Si, Al)_2O_6]$; and (3) olivine: $(Fe, Mg)_2SiO_4$. Ukrainian products are inexpensive and good-quality.

Tables 1 and 2 (from U.S. Patent Publication 2012/0104306) show examples of element ratios (wt. %) and the oxide-equivalent composition ratios (wt. %) determined by ICP analysis (using an inductively-coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 1

|   | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P | 0.05~0.10 | 0.05~0.09 | 0.07~0.10 |
| B | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |
| Cr | 0.01~0.03 | 0.01~0.03 | 0.01~0.03 |
| S | 0.01~0.03 | 0.01~0.03 | 0.01~0.03 |

TABLE 2

|   | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

In embodiments wherein glass batch is used as a supplemental feedstock, one glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass batch compositions may be used, such as those described in assignee's published U.S. application 20080276652.

As noted herein, submerged combustion burners and burner panels may produce violent turbulence of the molten inorganic material in the SCM and may result in sloshing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in assignee's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of feeder 658 may be adjusted through a signal, and one or more of fuel and/or oxidant conduits 24, 22 may be adjusted via a signal, it being understood that suitable transmitters and actuators, such as valves and the like, are not illustrated for clarity.

Melter apparatus in accordance with the present disclosure may also comprise one or more wall-mounted submerged combustion burners, and/or one or more roof-mounted burners (not illustrated). Roof-mounted burners may be useful to pre-heat the melter apparatus melting zone, and serve as ignition sources for one or more submerged combustion burners and/or burner panels. Melter apparatus having only wall-mounted, submerged-combustion burners or burner panels are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of batch particles to the exhaust, one or more roof-mounted burners could be used to form a curtain to prevent particulate carryover. In certain embodiments, all submerged combustion burners and burner panels may be oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical heating in certain embodiments, in certain melter zones.

Certain system embodiment may comprise burner panels as described in assignee's U.S. patent application Ser. No. 14/838,148 filed Aug. 27, 2014 comprising a burner panel body and one or more sets of concentric conduits for flow of oxidant and fuel. Certain burner panels disclosed therein include those wherein the outer conduit of at least some of the sets of concentric conduits are oxidant conduits, and the at least one inner conduit is one or more fuel conduits. Certain burner panel embodiments may comprise non-fluid cooled or fluid-cooled protective members comprising one or more noble metals. Certain burner panel embodiments may comprise non-fluid cooled or fluid-cooled protective members consisting essentially of one or more noble metals. Certain burner panel embodiments may comprise non-fluid cooled or fluid-cooled protective members consisting of one or more noble metals. Certain burner panel embodiments may comprise those wherein the lower fluid-cooled portion and the upper non-fluid cooled portion are positioned in layers, with the lower fluid-cooled portion supporting the sets of conduits and the associated protective members. Certain burner panel embodiments may comprise those wherein the non-fluid cooled protective member is a shaped annular disk having a through passage, the through passage of the shaped annular disk having an internal diameter substantially equal to but not larger than an internal diameter of the outer conduit. Certain burner panel embodiments may comprise those wherein an internal surface of the through passage of the shaped annular disk and a portion of a top surface of the shaped annular disk are not engulfed by the fluid-cooled or non-fluid-cooled portions of the panel body. Certain combustion burner panels may comprise a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and (b) a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body. Certain burner panel embodiments may comprise those wherein each fluid-cooled protective member is a fluid-cooled collar having an internal diameter about the same as an external diameter of the outer conduit, the fluid-cooled collar having an external diameter larger than the internal diameter. Certain burner panel embodiments may comprise a mounting sleeve. In certain burner panel embodiments the mounting sleeve having a diameter at least sufficient to accommodate the external diameter of the fluid-cooled collar. In certain embodiments, the burner panel may include only one or more fuel conduits, or only one or more oxidant conduits. These embodiments may be paired with other panels supplying fuel or oxidant (as the case might be), the pair resulting in combustion of the fuel from one panel with the oxidant from the other panel. In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

Suitable materials for glass-contact refractory, which may be present in SCMs and non-SC melters and downstream flow channels, and refractory panel bodies of burner panels, include AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material may be dictated by the geometry of the apparatus, the type of material being produced, operating temperature, burner body panel geometry, and type of glass or other product being produced.

The term "fluid-cooled" means use of a coolant fluid (heat transfer fluid) to transfer heat away from the component in question (such as structural walls of an SCM), either by the fluid traveling through the refractory of the panel, through conduits positioned in or adjacent the refractory of the panel, and the like, and does not include natural heat transfer that may occur by ambient air flowing past the panel, or ambient air merely existing adjacent a panel. For example, portions of the heat transfer substructure nearest the melter, distal portion of feedstock supply conduits, and the like may require fluid cooling. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in assignee's U.S. Pat. No. 8,769,992.

In certain SCMs, one or more fuel and/or oxidant conduits in the SCM and/or flow channel(s) downstream thereof may be adjustable with respect to direction of flow of the fuel or oxidant or both. Adjustment may be via automatic, semi-automatic, or manual control. Certain system embodiments may comprise a mount that mounts the fuel or oxidant conduit in a burner panel of the SCM and/or flow channel comprising a refractory, or refractory-lined ball joint. Other mounts may comprise rails mounted in slots in the wall or roof. In yet other embodiments the fuel and/or oxidant conduits may be mounted outside of the melter or channel, on supports that allow adjustment of the fuel or oxidant flow direction. Useable supports include those comprising ball joints, cradles, rails, and the like.

Certain systems and processes of the present disclosure may utilize measurement and control schemes such as described in Applicant's U.S. Pat. No. 9,096,453, and/or feed batch densification systems and methods as described in assignee's co-pending U.S. patent application Ser. No. 13/540,704, filed Jul. 3, 2012, now U.S. Pat. No. 9,643,869, issued May 9, 2017. Certain SCMs and processes of the present disclosure may utilize devices for delivery of treating compositions such as disclosed in assignee's U.S. Pat. No. 8,973,405.

Certain systems, apparatus, and method embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters burners or burner panels, temperature of the primary oxidant as it enters burners or burner panels, temperature of the effluent (exhaust) at melter exhaust exit, pressure of the primary oxidant entering burners or burner panels, humidity of the oxidant, burner or burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes. Flow diverter positions may be adjusted or controlled to increase heat transfer in heat transfer substructures and exhaust conduits.

Various conduits, such as feedstock supply conduits, exhaust conduits, oxidant and fuel conduits of burners or burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the conduits and/or space required for conduits. In certain locations, precious metals and/or noble metals (or alloys) may be used for portions or all of these conduits. Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions, as further explained in assignee's International Patent Application Serial No. PCT/US13/42182, filed May 22, 2013, now published WO2014189504.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of (or consisting of) a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, or consisting of 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of melt to be produced with certain feedstocks. The skilled artisan, having knowledge of the particular application, pressures, temperatures, and available materials, will be able design the most cost effective, safe, and operable heat transfer substructures, feedstock and exhaust conduits, burners, burner panels, and melters for each particular application without undue experimentation.

The total quantities of fuel and oxidant used by burners or burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. The amount of heat needed to be produced by combustion of fuel in the melter (and/or Joule heating) will depend upon the efficiency of the preheating of the feedstock in the feedstock heat exchange substructure. The larger the amount of heat transferred to the feedstock, the lower the heat energy required in the melter from the fuel and/or Joule elements.

In SCMs, the velocity of the fuel in the various burners and/or burner panel embodiments depends on the burner/burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Baffles may be provided extending from the roof, and/or in the melter exhaust conduit, such as in the heat exchange substructure, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate.

A combustion and/or Joule heating process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner panel control elements, and/or to local devices associated with burner panel control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A system comprising:
    (a) a structure defining a submerged combustion melting chamber including one or more submerged combustion burners;
    (b) an insulated exhaust conduit connected to the structure defining the submerged combustion melting chamber and defining a heat exchange substructure, the insulated exhaust conduit positioned at an angle θ to vertical ranging from about 10 to about 75 degrees;
    (c) the insulated exhaust conduit fluidly connecting the submerged combustion melting chamber to a 3-way flow wye branch connector having an inlet and first and second outlets, the inlet and first outlet of the 3-way flow wye branch connector angled at angle θ and connecting an upper end of the insulated exhaust conduit with an angled insulated feedstock supply conduit also positioned at the angle θ to vertical, and the second outlet positioned vertically and connected to a vertical upper exhaust conduit;
    (d) a feedstock supply structure connected to the angled insulated feedstock supply conduit.

2. The system in accordance with claim 1 wherein the angle θ ranges from about 25 to about 60 degrees.

3. The system in accordance with claim 1 wherein the feedstock supply structure and the heat exchange substructure are configured to allow feedstock having size ranging from about 1 cm to about 10 cm to flow into the melting chamber and allow direct heat exchange from at least some of the exhaust flowing from the melting chamber to at least some of the feedstock.

4. A feedstock supply structure apparatus comprising:
    (a) an insulated exhaust conduit fluidly and mechanically connectable to a structure defining a submerged combustion melting chamber including one or more submerged combustion burners, the insulated exhaust conduit positioned at an angle to vertical ranging from about 10 to about 90 degrees;
    (b) the insulated exhaust conduit defining a heat exchange substructure; and
    (c) a feedstock supply structure fluidly and mechanically connectable to the insulated exhaust conduit;

wherein the insulated exhaust conduit comprises a first vertical insulated exhaust conduit defining a first portion of the heat exchange substructure fluidly connected to a first 3-way flow wye branch connector, the first 3-way flow wye branch connector fluidly connecting the first vertical insulated exhaust conduit with a second vertical exhaust conduit and an angled insulated exhaust conduit, the angled insulated exhaust conduit being at an angle ranging from about 25 to about 60 degrees to vertical, the angled insulated exhaust conduit fluidly connected to a second 3-way flow wye branch connector, the second 3-way flow wye branch connector fluidly connecting the angled insulated exhaust conduit to a third vertical exhaust conduit and with an angled feedstock supply conduit, the angled feedstock supply conduit fluidly connected to a feedstock supply container, and the first 3-way flow wye branch connector or the second vertical exhaust conduit comprising a damper mechanism disposed therein for diverting at least a portion of the exhaust to the angled insulated exhaust conduit, the damper mechanism in turn connected to a prime mover.

5. A feedstock supply structure apparatus comprising:
(a) an insulated exhaust conduit fluidly and mechanically connectable to a structure defining a submerged combustion melting chamber including one or more submerged combustion burners, the insulated exhaust conduit positioned at an angle to vertical ranging from about 10 to about 90 degrees;
(b) the insulated exhaust conduit defining a heat exchange substructure; and
(c) a feedstock supply structure fluidly and mechanically connectable to the insulated exhaust conduit;

wherein the insulated exhaust conduit connects the melting chamber to a 3-way flow wye branch connector, the 3-way flow wye branch connector fluidly connecting the insulated exhaust conduit with an angled insulated feedstock supply conduit and to a vertical exhaust conduit, the angled insulated feedstock supply conduit fluidly connected to a feedstock supply container.

* * * * *